United States Patent
Nishigami

[11] Patent Number: 5,890,010
[45] Date of Patent: Mar. 30, 1999

[54] DATA PROCESSING APPARATUS WITH A COPROCESSOR WHICH ASYNCHRONOUSLY EXECUTES COMMANDS STORED IN A COPROCESSOR COMMAND STORAGE SECTION

[75] Inventor: Satoshi Nishigami, Kawasaki, Japan

[73] Assignee: Fujitsu Limited, Kawasaki, Japan

[21] Appl. No.: 915,566

[22] Filed: Aug. 21, 1997

Related U.S. Application Data

[63] Continuation of Ser. No. 332,398, Oct. 31, 1994, abandoned.

[30] Foreign Application Priority Data

Feb. 7, 1994 [JP] Japan .................................. 6-013421

[51] Int. Cl.$^6$ ...................................................... G06F 17/00
[52] U.S. Cl. .................................................. 395/800.34
[58] Field of Search ...................... 395/800.34, 800.35, 395/800.36, 568, 183.01, 183.03, 183

[56] References Cited

U.S. PATENT DOCUMENTS

| | | | |
|---|---|---|---|
| 4,803,481 | 2/1989 | Mueller et al. | 340/825.5 |
| 4,860,191 | 8/1989 | Nomura et al. | 364/200 |
| 4,901,232 | 2/1990 | Harrington et al. | 395/826 |
| 4,926,318 | 5/1990 | Nakayama | 395/287 |
| 5,093,908 | 3/1992 | Beacom et al. | 395/375 |
| 5,133,057 | 7/1992 | Ishii et al. | 395/375 |
| 5,197,138 | 3/1993 | Hobbs et al. | 395/375 |
| 5,218,711 | 6/1993 | Yoshida | 395/800 |
| 5,293,586 | 3/1994 | Yamazaki et al. | 395/164 |
| 5,567,900 | 10/1996 | Higashi | 84/602 |

FOREIGN PATENT DOCUMENTS 4-106652  4/1992  Japan .

Primary Examiner—Ellis B. Ramirez
Attorney, Agent, or Firm—Staas & Halsey

[57] ABSTRACT

A data processing apparatus wherein, upon occurrence of an exception in a coprocessor, appropriate and flexible exception processing can be performed and the regularity of operation of the coprocessor can be verified. The data processing apparatus includes a command execution control section provided in a CPU for receiving a command to access a coprocessor command storage section of the coprocessor and executing the command to access the coprocessor command storage section. A group of commands is adopted for executing such access so that the CPU can execute access to the coprocessor command storage section. The data processing apparatus can be applied to a data processing apparatus having a coprocessor such as a floating-point calculation apparatus.

21 Claims, 6 Drawing Sheets

FIG. 3 (A) COMMAND QUEUE CLEAR COMMAND
cl.fq GRi

FIG. 3 (B) MOVE COMMAND TO COMMAND QUEUE
mv.grfq GRi,FQj

FIG. 3 (C) MOVE COMMAND FROM COMMAND QUEUE
mv.fqgr FQj,GRi

FIG. 3 (D) LOAD COMMAND TO COMMAND QUEUE
ldnq GRi,GRj,NQk

FIG. 3 (E) STORE COMMAND FROM COMMAND QUEUE
stnq NQk,GRi,GRj

DATA PROCESSING APPARATUS WITH A COPROCESSOR WHICH ASYNCHRONOUSLY EXECUTES COMMANDS STORED IN A COPROCESSOR COMMAND STORAGE SECTION

This application is a continuation of application Ser. No. 08/332,398, filed Oct. 31, 1994, now abandoned.

BACKGROUND OF THE INVENTION

1) Field of the Invention

This invention relates to a data processing apparatus having a coprocessor for asynchronously processing commands to execute commands at a high speed, an exception processing method for processing, when an exception occurs at a coprocessor, the exception, and a method of verifying the regularity of operation of the coprocessor.

2) Description of the Prior Art

In order to process an exception precisely with a data processing apparatus having a coprocessor such as, for example, a floating-point calculation apparatus, information of the exception must be reported in detail as the need arises. Further, in order to verify whether an operation dependent upon occurrence of an exception is performed correctly, an abnormal condition must be set in the program and a result of the abnormal condition must be confirmed.

An exemplary one of conventional exception processing systems for an asynchronous coprocessor is disclosed, for example, in Japanese Patent Laid-Open Application No. Heisei 4-106652. In the conventional exception processing system, only direct information regarding a coprocessor command with which an exception has occurred is notified to a central processing unit (hereinafter CPU) from a coprocessor. Here, an exception signifies an event wherein a command cannot be executed regularly, for example, a certain value is divided by 0 or an inaccessible area is designated by an operand in a command.

FIG. 6 schematically shows an exemplary construction of a data processing apparatus of the type described above. Referring to FIG. 6, the data processing apparatus shown includes a CPU 60 for executing a command, and a coprocessor 70 connected to the CPU 60 for asynchronously executing coprocessor commands issued by the CPU 60.

A memory 64 is provided for the CPU 60. The CPU 60 includes a command control section 61, a plurality of general-purpose registers 62 and an arithmetic unit 63. The coprocessor 70 includes a control section 71, at least one coprocessor arithmetic unit 72 and a coprocessor command queue 73.

A coprocessor command bus 81 is provided between the command control section 61 and the coprocessor command queue 73 for transmitting coprocessor commands from the command control section 61 to the coprocessor command queue 73. A register number bus 82 is provided between the control section 71 and the general-purpose registers 62 for transmitting write register numbers, read register numbers, and so forth, from the control section 71 to the general-purpose registers 62.

A source data bus 83 is provided between the general-purpose registers 62 and the data input side of the coprocessor arithmetic unit 72 for transmitting source data from the general-purpose registers 62 to the coprocessor arithmetic unit 72. An output bus 84 is provided between the calculation result output side of the coprocessor arithmetic unit 72 and the general-purpose registers 62 for transmitting the output of the coprocessor arithmetic unit 72 to the general-purpose registers 62.

The command control section 61 of the CPU 60 synchronously and successively reads out program commands stored in the memory 64 and sequentially executes the program commands. The command control section 61 notifies commands to the coprocessor 70 by way of the coprocessor command bus 81 when commands to be calculated by the coprocessor 70 are detected during execution of the series of commands.

The control section 71 of the coprocessor 70 controls a calculation processing operation of the coprocessor arithmetic unit 72 and controls and executes an exception processing operation, hereinafter described, when an exception occurs during calculation processing of the coprocessor arithmetic unit 72.

The coprocessor arithmetic unit 72 of the coprocessor 70 receives source data from the general-purpose registers 62 of the CPU 60, executes calculation processing using the source data in response to an instruction from the control section 71 and outputs a result of the calculation to the general-purpose registers 62 of the CPU 60.

In this instance, source data are inputted, to the coprocessor arithmetic unit 72 from that one of the general-purpose registers 62 which has a read register number designated by the control section 71, or where a plurality of coprocessor arithmetic units 72 are provided, to a selected one of the coprocessor arithmetic units 72, by way of the source data bus 83. Meanwhile, the result of calculation by the coprocessor arithmetic unit 72 is written, via the register number bus 82 by way of the output bus 84, into the general-purpose register 62 which has a write register number designated by the control section 71.

The coprocessor command queue 73 of the coprocessor 70 stores coprocessor commands notified thereto from the command control section 61 of the CPU 60 by way of the coprocessor command bus 81. The coprocessor command queue 73 includes a plurality of exception flag registers 74 each for storing, when an exception has occurred in the coprocessor 70, a flag representing the occurrence of an exception.

In the data processing apparatus constructed in such a manner as described above, when an exception occurs during calculation processing in the coprocessor arithmetic unit 72, a type of the exception is written into a corresponding one of the exception flag registers 74 provided in the coprocessor command queue 73.

Meanwhile, the control section 71 recognizes an exception occurrence position at the coprocessor command queue 73, discriminates a type of the exception from the exception flag register 74 and executes exception processing in accordance with the type of the exception. Then, the control section 71 notifies the CPU 60 of information regarding the coprocessor command at which the exception has occurred.

In the conventional data processing apparatus described above, information other than information regarding a coprocessor command at which an exception has occurred except that a result of calculation is reported from the coprocessor arithmetic unit 72 to the CPU 60. Accordingly, the CPU 60 cannot readily grasp a flow of processing in the coprocessor 70 executed under a series of commands at a point of time at which an exception occurs. Consequently, the conventional data processing apparatus has a problem in that the CPU 60 cannot make a suitable determination of a cause of occurrence of an exception which has occurred in the coprocessor 70 and the CPU 60 cannot execute processing based on an appropriate determination regarding the exception.

Further, in the conventional data processing apparatus, access from the CPU 60 to the coprocessor command queue 73 is permitted to write a coprocessor information, but any other access from the CPU 60 to the coprocessor command queue 73 is not permitted. Accordingly, the conventional data processing apparatus has another problem in that it is difficult for the CPU 60 to verify whether coprocessor commands instructed from the CPU 60 to the coprocessor 70 are held regularly in the coprocessor command queue 73 and also in that, when the processing of the CPU 60 returns to regular processing, the CPU 60 cannot change the information in the coprocessor command queue 73 arbitrarily and consequently the CPU 60 cannot take a flexible countermeasure against an exception.

SUMMARY OF THE INVENTION

It is an object of the present invention to provide a data processing apparatus, an exception processing method for a data processing apparatus and an operation verification method for a data processing apparatus wherein, upon occurrence of an exception, a CPU can grasp a flow of processing in a coprocessor executed under a series of commands and execute appropriate and flexible exception processing.

It is another object of the present invention to provide a data processing apparatus, an exception processing method for a data processing apparatus and an operation verification method for a data processing apparatus wherein, upon occurrence of an exception, a CPU can verify a regular operation of a coprocessor.

In order to attain the objects described above, according to an aspect of the present invention, there is provided a data processing apparatus, which comprises a central processing section for executing a command, and a coprocessor connected to the central processing section and including a coprocessor command storage section for storing coprocessor commands instructed from the central processing section, the coprocessor asynchronously executing coprocessor commands stored in the coprocessor command storage section, the central processing section including a command execution control section for receiving a command to access the coprocessor command storage section of the coprocessor and executing the command to access the coprocessor command storage section.

With the data processing apparatus, the command execution control section can execute various accesses to the coprocessor command storage section from the central processing section, and using a command to access the coprocessor command storage section, the stored contents of the coprocessor command storage section can be checked from a program of the central processing section or, if necessary, coprocessor commands can be cleared or changed.

Accordingly, the entire stored contents of the coprocessor command storage section can be grasped and processing based on a better determination can be achieved. Further, since the stored contents of the coprocessor command storage section can be checked at an arbitrary point of time, information effective to optimization of the processing procedure in development of a program can be obtained. Furthermore, since the stored contents of the coprocessor command storage section can be accessed directly from a program of the central processing section, a test program for automatically detecting a failure can be produced readily which allows problems to be discovered efficiently.

According to another aspect of the present invention, there is provided an exception processing method, which is performed on the data processing apparatus described above and comprises the steps of issuing, when an exception regarding execution of a coprocessor commands occurs in the coprocessor, from the central processing section, a read command to refer to stored contents of the coprocessor command storage section, executing the read command by the command execution control section to read the stored contents of the coprocessor command storage section, and referring, by the central processing section, to the stored contents read out from the coprocessor command storage section to determine an occurrence condition of the exception and executing processing in accordance with the exception.

With the exception processing method for a data processing apparatus, when an exception occurs, using a command to access the coprocessor command storage section, the stored contents of the coprocessor command storage section are referred to or, if necessary, coprocessor commands are cleared or changed. Consequently, upon occurrence of an exception, the central processing section can grasp a flow of processes executed in the coprocessor in accordance with a series of commands and execute appropriate and flexible exception processing.

According to a further aspect of the present invention, there is provided an operation verification method, which is performed on the data processing apparatus described above and comprises the steps of issuing from the central processing section to the coprocessor command storage section a read command to refer to stored contents of the coprocessor command storage section, executing the read command by the command execution control section to read the stored contents of the coprocessor command storage section, and referring, by the central processing section, to the stored contents read out from the coprocessor command storage section to confirm whether or not coprocessor commands issued from the central processing section to the coprocessor are held in the coprocessor command storage section to verify the regularity of operation of the coprocessor.

According to a still further aspect of the present invention, there is provided an operation verification method, which is performed on the data processing apparatus described above and comprises the steps of intentionally issuing from the central processing section to the coprocessor a coprocessor command with which an exception is to occur, confirming whether or not an anticipated exception has occurred with the coprocessor in response to the coprocessor command to verify the regularity of operation of the coprocessor when an exception regarding execution of a coprocessor command occurs in the coprocessor, issuing, from the central processing section to the coprocessor command storage section of the coprocessor which is in an inoperative condition due to occurrence of the exception, a change command to change stored contents of the coprocessor command storage section, executing the change command by the command execution control section to change the stored contents of the coprocessor command storage section, issuing, from the central processing section to the coprocessor command storage section, a read command to refer to the stored contents of the coprocessor command storage section, executing the read command by the command execution control section to read the stored contents of the coprocessor command storage section, and referring, by the central processing section, to the stored contents read out from the coprocessor command storage section to confirm whether or not the stored contents of the coprocessor command storage section have been changed in response to the change command to verify the regularity of operation of the coprocessor.

With the operation verification methods for a data processing apparatus, using a command to access the coprocessor command storage section, the stored contents of the coprocessor command storage section are checked or changed at an arbitrary point of time. Consequently, verification of regular operation of the coprocessor can be performed from the central processing section, and a problem in the coprocessor can be discovered efficiently.

Further objects, features and advantages of the present invention will become apparent from the following detailed description when read in conjunction with the accompanying drawings in which like parts or elements are denoted by like reference characters.

BRIEF DESCRIPTION OF THE DRAWINGS

FIGS. 3(A), 3(B), 3(C), 3(D) and 3(E) are diagrammatic views illustrating different access commands employed in the data processing apparatus of FIG. 2;

DESCRIPTION OF THE PREFERRED EMBODIMENT

Figure 1:
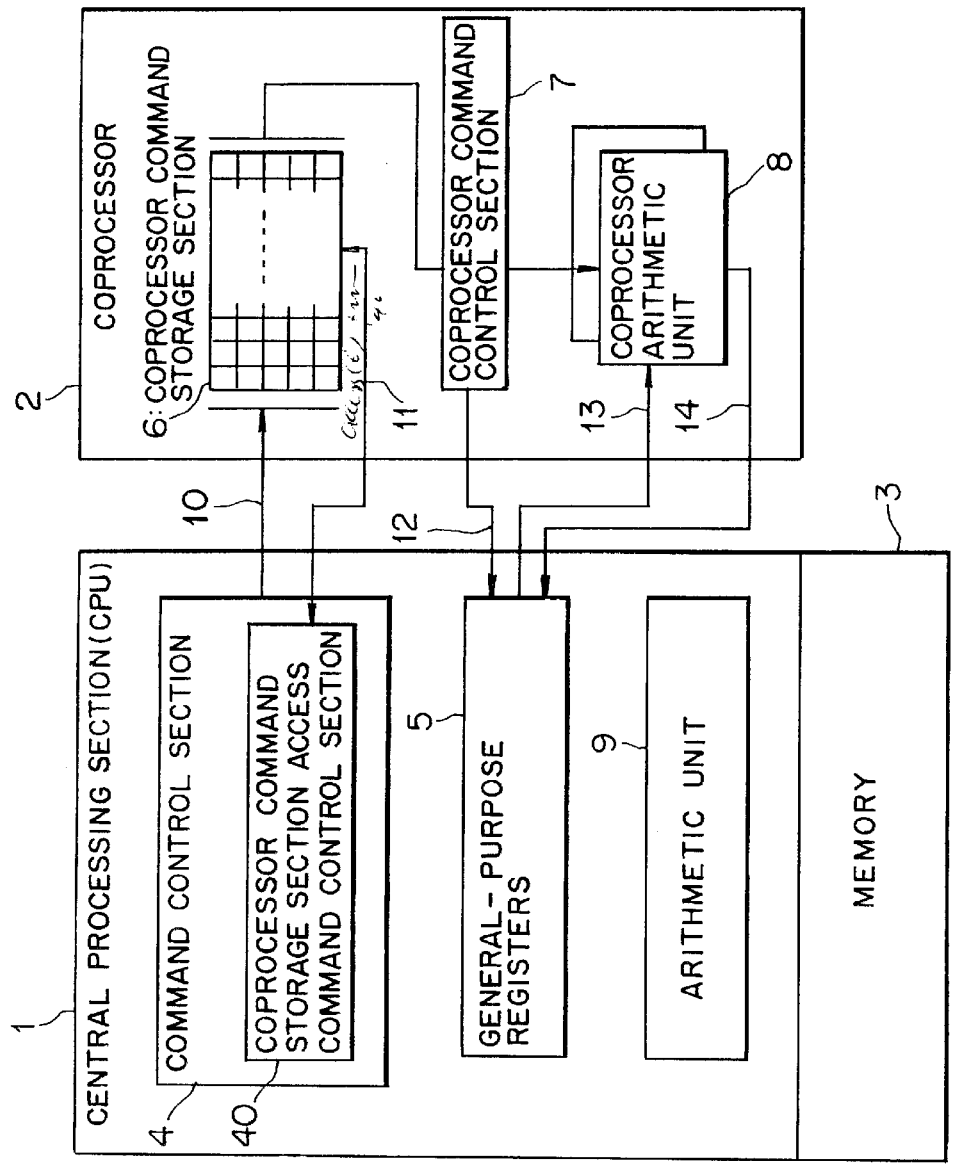
FIG. 1 is a block diagram illustrating an aspect of the present invention.

Referring first to FIG. 1, there is shown a data processing apparatus according to an aspect of the present invention. The data processing apparatus includes at least one CPU 1 for executing a command, and a coprocessor 2 connected to the CPU 1 for asynchronously executing coprocessor commands issued by the CPU.

A memory 2 is provided for the CPU 1, and the CPU 1 includes a command control section 4, a plurality of general-purpose registers 5 and an arithmetic unit 9. The coprocessor 2 includes a coprocessor command storage section 6, a coprocessor command control section 7 and a coprocessor arithmetic unit 8. Unless otherwise described specifically, it is assumed in the following description that only one coprocessor 2 is provided.

The data processing apparatus further includes a coprocessor command bus 10 (hereinafter referred to as command bus), a coprocessor command storage section 11 (hereinafter referred to as access bus), a general-purpose register number/interruption information bus 12 (hereinafter referred to as register bus), a general-purpose register read data bus 113 (hereinafter referred to as read data bus), and a general-purpose register write data bus 14 (hereinafter referred to as write data bus).

The command control section 4 of the CPU 1 successively and synchronously reads program commands stored in the memory 3 and sequentially executes the program commands. The command control section 4 notifies the commands to the coprocessor 2 by way of the command bus 10 when commands to be calculated by the coprocessor 2 are detected during executing of a series of such commands.

The command control section 4 includes a coprocessor command storage section access command control section 40 (command execution control section) which executes, when it receives a command (coprocessor command storage section access command) to access the coprocessor command storage section 6 of the coprocessor 2, the command to access the coprocessor command storage section 6 by way of the access bus 11.

The coprocessor command storage section 6 of the coprocessor 2 stores coprocessor commands issued from the CPU 1 and includes a single command queue or a plurality of command queues corresponding to different types of coprocessor commands. The coprocessor command storage section access command can designate, with an operand thereof, the position of an object for access in the command queue or queues.

In the present invention, for a coprocessor command storage section access command, a read command for reading, i.e. transferring, stored contents of the coprocessor command storage section 6 into a general-purpose register 5 (or the memory 3) to refer to the stored contents, a change (modify) command for writing stored contents of a general-purpose register 5 (or the memory 3) into the coprocessor command storage section 6 to change (modify) the stored contents of the coprocessor command storage section 6, a clear command for clearing the stored contents of the coprocessor command storage section 6 and so forth are prepared. Thus, by executing any of the commands, the stored contents of the coprocessor command storage section 6 can be accessed from a program which is executed by the CPU 1.

Any general-purpose register 5 of the CPU 1 holds data comprising an object for calculation, and the arithmetic unit 9 of the CPU 1 performs a calculation such as addition or subtraction or such data designated by a command.

The coprocessor command control section 7 of the coprocessor 2 controls execution of coprocessor commands stored in the coprocessor command storage section 6 and notifies a general-purpose register number, interruption information and so forth, to the CPU 1 by way of the register bus 12.

Each coprocessor 2 is provided with at least one coprocessor arithmetic unit 8. Each coprocessor arithmetic unit 8 is controlled by the coprocessor command control section 7 so as to perform a calculation designated by a coprocessor command using source data, notified thereto from a general-purpose register 5 by way of the read data bus 13, and outputs a result of the calculation to the general-purpose register 5 by way of the write data bus 14.

In this instance, source data is inputted to the coprocessor arithmetic unit 8 by way of the read data bus 13 from one of the general-purpose registers 5 having a register number equal to a read register number designated by the coprocessor command control section 7, by way of the register bus 12. Further, a result of calculation by the coprocessor command control section 7 is written by way of the write data bus 14, into a general-purpose register 5 of a write register number designated by the coprocessor command control section 7 by way of the read data bus 13.

The command bus 10 is provided between the command control section 4 and the coprocessor command storage section 6. The command bus 10 transfers coprocessor commands from the command control section 4 to the coprocessor command storage section 6 therethrough. The access bus 11 is provided between the coprocessor command storage section access command control section 40 and the coprocessor command storage section 6. The access bus 11 accesses storage section 6 from the coprocessor command storage section access command control section 40.

The register bus 12 is provided between the coprocessor command control section 7 and the general-purpose registers 5. The register bus 12 transfers a general-pulse register number or interruption information from the coprocessor command control section 7 to the general-purpose registers 5. The read data bus 13 is provided between the general-purpose registers 5 and the data input side of the coprocessor arithmetic unit 8. The read data bus transfers source data read out from a general-purpose register 5 to the coprocessor arithmetic unit 8. The write data bus 14 is provided between the calculation result output side of the coprocessor arithmetic unit 8 and the general-purpose registers 5. The write data bus 14 transfers the output (result of calculation) of the coprocessor arithmetic unit 8 to the general-purpose registers 5.

In the data processing apparatus constructed in such a manner as described above, if an exception regarding execution of a coprocessor command occurs in the coprocessor 2, the CPU 1 issues a read command to refer to stored contents of the coprocessor command storage section 6, and the access command control section 40 executes the read command to read the stored contents of the coprocessor command storage section 6. Further, the CPU 1 refers to the stored contents read from the coprocessor command storage section 6 to determine an occurrence condition of the exception and executes processing in accordance with the exception.

In this instance, if the coprocessor command, at which the exception has occurred, is an irregular command which cannot be executed regularly, a clear command for clearing the stored contents of the coprocessor command storage section 6 is issued from the CPU 1 to the coprocessor command storage section 6. The access command control section 40 then executes the clear command to clear the contents of the coprocessor command storage section 6 to cancel execution of coprocessor commands following the coprocessor command which was being executed at the point of time at which the exception occurred. In this instance, the stored contents of the coprocessor command storage section 6 can be cleared partially or entirely by executing the clear command designating a clear object position of the coprocessor command storage section 6.

Alternatively, when the coprocessor command, at which the exception has occurred, is an irregular command which cannot be executed regularly, a change command to change the stored contents of the coprocessor command storage section 6 may be issued from the CPU 1 to the coprocessor command storage section 6. In this instance, the access command control section 40 executes the change command to change the contents of the coprocessor command storage section 6 to change coprocessor commands following the coprocessor command which was being executed at the point of time at which the exception occurred. In this instance, the stored contents of the coprocessor command storage section 6 can be changed partially or entirely by executing the change command designating a change object position of the coprocessor command storage section 6.

When it is determined that the coprocessor command at which the exception has occurred is regular, the CPU 1 causes the coprocessor 2 to execute the coprocessor command again, and then if an exception occurs also upon the second execution of the coprocessor command, the CPU 1 determines that a fixed trouble has occurred with the coprocessor 2 and ends the processing by the coprocessor 2 at the point of time.

As another alternative, the CPU 1 may issue to the coprocessor command storage section 6 a read command to refer to stored contents of the coprocessor command storage section 6. In this instance, the access command control section 40 executes the read command to read the stored contents of the coprocessor command storage section 6. Then, the CPU 1 refers to the stored contents read from the coprocessor command storage section 6 to confirm whether coprocessor commands issued from the CPU 1 to the coprocessor 2 are held in the coprocessor command storage section 6 to verify the regularity of operation of the coprocessor.

Otherwise, the CPU 1 may intentionally issue to the coprocessor 2 a coprocessor command with which an exception is to occur. In this instance, it is confirmed whether an anticipated exception has occurred with the coprocessor 2 in response to the coprocessor command to verify the regularity of operation of the coprocessor 2 when an exception regarding execution of a coprocessor command occurs in the coprocessor 2. Then, the CPU 1 issues, to the access command control section 40 of the coprocessor 2, which is in an inoperative condition due to occurrence of the exception, a change command to change stored contents of the coprocessor command storage section 6. The access command control section 40 then executes the change command to change the stored contents of the coprocessor command storage section 6. Thereafter, the CPU 1 issues, to the coprocessor command storage section 6, a read command to refer to the stored contents of the coprocessor command storage section 6. The access command control section 40 then executes the read command to read the stored contents of the coprocessor command storage section 6. Then, the CPU 1 refers to the stored contents read out from the coprocessor command storage section 6 to confirm whether the stored contents of the coprocessor command storage section 6 have been changed in response to the change command to verify the regularity of operation of the coprocessor 2.

Thus, the present invention provides means (coprocessor command storage section access command control section (command execution control section) 40) for accessing the coprocessor command storage section 6 in the coprocessor 2 from the CPU 1 and a new group of commands for executing accessing to the coprocessor command storage section 6.

Then, when a read command to read the stored contents of the coprocessor command storage section 6 in the object coprocessor 2 is issued from the program of the CPU 1, the stored contents of the coprocessor command storage section 6 (or, where a plurality of coprocessors 2 are provided, a designated one of such coprocessor storage sections 6) are notified to the program by way of a general-purpose register 5 or the memory 3. The program can discriminate the thus notified contents and take a suitable countermeasure.

Further, since the stored contents of the coprocessor command storage section 6 can be changed directly or read out, edited and written back into the coprocessor command storage section 6 by issuing a change command to change the stored contents of the coprocessor command storage section 6, the regularity of operation of the coprocessor 2, and particularly, the coprocessor command storage section 6 of the coprocessor 2, can be verified using a diagnosis program or like means.

In this manner, according to the present invention, a program which operates on the CPU 1, particularly an interrupt handler, can execute, upon occurrence of an exception, the following processes to the asynchronous coprocessor 2.

1. Determining a type of an interruption, and when it is determined that some commands may possibly remain in the coprocessor command storage section 6 as a result of the interruption, no operation is performed for the coprocessor command storage section 6.

2. Determining whether some commands remain in each coprocessor command storage section 6, and if no command remains, no operation is performed for the coprocessor command storage section 6.

3. When some remaining commands exist in the coprocessor command storage section 6, if the interruption is not notified from the coprocessor 2, the exception processing is ended only after, stored contents of the coprocessor command storage section 6 are saved.

4. If the interruption is notified from the coprocessor 2 in which some commands remain in the coprocessor command storage section 6, the saved contents of the coprocessor command storage section 6 are edited (cleared or changed) in accordance with the type of the exception occurred and are written back into the compressor command storage section 6 upon returning of the processing from the interruption.

If such interruption processes are performed, then the entire stored contents of the coprocessor command storage section 6 can be grasped, and processing based on a better determination can be performed. Further, since the stored contents of the coprocessor command storage section 6 can be checked at an arbitrary point of time, information effective to optimization of the processing procedure in development of a program can be obtained. Furthermore, since the stored contents of the coprocessor command storage section 6 can be accessed directly from a program of the CPU 1, a test program for automatically detecting a failure can be produced readily, and by using the test program, a trouble can be found out efficiently.

Figure 2:
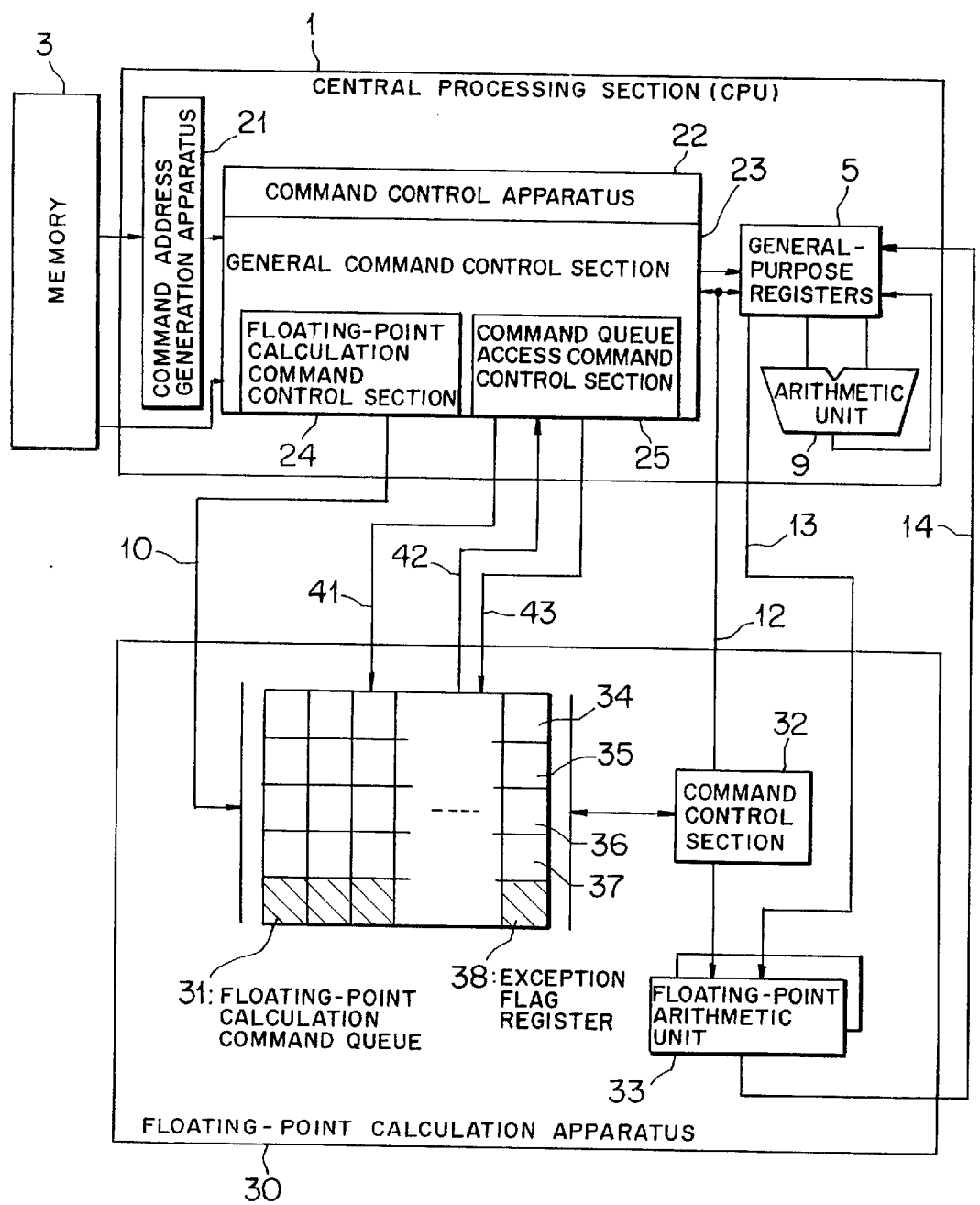
FIG. 2 is a block diagram of a data processing apparatus showing a preferred embodiment of the present invention.

FIG. 2 shows a data processing apparatus to which the present invention is applied. The data processing apparatus of the present embodiment is specifically constructed such that an arithmetic unit for asynchronously executing processing of an integer calculation command or a like command is provided in a CPU while a floating-point calculation apparatus including at least one floating-point arithmetic unit (coprocessor arithmetic unit) is provided as a coprocessor which operates asynchronously. However, according to the present invention, though not specifically described herein, any coprocessor can be employed in the data processing apparatus if it operates asynchronously. For example, a coprocessor which includes a special integer arithmetic unit or a vector arithmetic unit may be employed.

The data processing apparatus shown generally comprises a central processing unit (CPU) 1, a memory 3, a command bus 10, a register number bus 12, a read data bus 13, a write data bus 14, and a floating-point calculation apparatus (asynchronous coprocessor) 30. The CPU 1 includes a plurality of general-purpose registers 5, an arithmetic unit 9, a command address generation apparatus 21, and a command control apparatus 22. The floating-point calculation apparatus 30 includes a floating-point calculation command queue 31, a command control section 32, and a floating-point arithmetic unit 33.

The data processing apparatus further includes a floating-point calculation command queue number bus (hereinafter referred to as command queue number bus) 41, a floating-point calculation command queue read data bus (hereinafter referred to as command queue read data bus) 42, and a floating-point calculation command queue write data bus (hereinafter referred to as command queue write data bus) 43.

The command control apparatus 22 of the CPU 1 acquires an address of a command from the command address generation apparatus 21, successively reads out program commands stored in the memory 3 and controls execution of the commands. To this end, the command control apparatus 22 includes a general command control section 23 which in turn includes a floating-point command control section 24 and a command queue access command control section (command execution control section) 25.

The general command control section 23 decodes a command read out from the memory 3 and, if the command is an ordinary integer calculation command or a like command, causes the arithmetic unit 9 of the CPU 1 to execute the command and then causes a result of the calculation by the arithmetic unit 9 to be written into one of the general-purpose registers 5 (or the memory 3).

The floating-point command control section 24 sends, when the command read out from the memory 3 is a floating-point calculation command to be executed by the floating-point calculation apparatus 30, the floating-point calculation command to the floating-point calculation command queue 31 by way of the command bus 10. The functions of the command queue access command control section 25 will be hereinafter described.

In the data processing apparatus of the present embodiment, the floating-point calculation command queue 31 generally comprises, as entries thereof, a plurality of command code registers 34 each for storing a command code of a floating-point calculation command, a plurality of first operand registers 35 each for designating a first operand (source data) of a command, a plurality of second operand registers 36 each for designating a second operand (source data) of a command, a plurality of third operand registers 37 for designating a third operand for storing a result of calculation, and a plurality of exception flag registers 38 each for storing an exception flag. The manner of use of the registers 34 to 38 is the same as in the prior art disclosed, for example, in Japanese Patent Laid-Open Application No. Heisei 4-106652.

The command control section 32 of the floating-point calculation apparatus 30 successively reads out commands from the floating-point calculation command queue 31 and controls the floating-point arithmetic unit 33 in accordance with a command code from the command code register 34.

The floating-point arithmetic unit 33 receives, as input data thereto, source data from that one of the general-purpose registers 5 which is designated by a first operand and a second operand by way of the read data bus 13. The floating point arithmetic unit 33 executes a calculation using the received source data and outputs and writes a result of the calculation to and into that one of the general-purpose registers 5 which is designated by a third operand by way of the write data bus 14.

Further, if an exception occurs during operation of the floating-point calculation apparatus 30 (floating-point arithmetic unit 33), the type of exception is written into an exception flag register 38 of the floating-point calculation command queue 31 by the function of the command control section 32. The command control section 32 has another function of notifying, when it detects occurrence of an exception in the floating-point arithmetic unit 33, the CPU 1 that an exception has occurred. Upon reception of the notification of occurrence of an exception, the command control apparatus 22 of the CPU 1 generates a particular exception interruption to start an exception processing routine (particular interrupt handler).

On the other hand, the command queue access command control section 25 of the CPU 1 is started when the command decoded by the general command control section 23 is a command to access a floating-point calculation command queue 31. The command queue access command control section 25 is connected to the floating-point calculation command queues 31 by way of the command queue number bus 41, the command queue read data bus 42 and the command queue write data bus 43 so as to perform execution control of processing such as read access, modify (write) address, clear access and so forth for stored contents of the floating-point calculation command queue 31 by way of the buses 41 to 43.

FIGS. 3(A) to 3(E) illustrate different examples of commands prepared for accessing to a coprocessor command queue (floating-point calculation command queue 31 or the like). Here, FIGS. 3(A) to 3(C) illustrate examples of commands where the coprocessor is a floating-point calculation apparatus, and FIGS. 3(D) and 3(E) illustrate examples of commands where the coprocessor is an integer calculation apparatus.

FIG. 3(A) illustrates a command queue clear command; FIG. 3(B) illustrates a move command (write command, change command) to a command queue; FIG. 3(C) illustrates a move command (read command) from a command queue; FIG. 3(D) illustrates a load command to a command queue; and FIG. 3(E) illustrates a store command from a command queue. Particularly here, while FIGS. 3(B) and 3(C) illustrate examples of move type commands to and from a general-purpose register 5 and FIGS. 3(D) and 3(E) illustrate examples of load/store type commands from and to the memory 3, a set of commands different from them may be employed depending upon the type of the calculation apparatus of the coprocessor and the type of an access command.

In the commands illustrated in FIGS. 3(A) to 3(E), "GRi" and "GRj" denote the ith and jth general-purpose registers of, for example, 4-byte length, and "FQj" denotes the jth entry of a floating-point calculation command queue constituted from, for example, command control section 32 stages of 8-byte length (or 4-byte length). Further, "NQk" denotes the kth entry of an integer calculation command queue of 4-byte length where the coprocessor includes an integer arithmetic unit which executes a special integer calculation. The byte lengths mentioned are mere examples, and any other byte lengths may be employed.

The command queue clear command "cl.fq GRi" illustrated in FIG. 3(A) is a command to clear the entry "FQj" (jth entry of a floating-point calculation command queue) at a position corresponding to an address at which "1" is set in a value of the ith general-purpose register GR1. In particular, an entry corresponding to a command queue is cleared such that, if the 0th bit of the general-purpose register GRi is "1", then the top entry of the command queue is cleared, but if the first bit is "1", then the second entry of the command queue is cleared.

The movement command "mv.grfq GRi,FQj" to a command queue illustrated in FIG. 3(B) is a command to transfer and write stored contents of the ith general-purpose register GRi and the i+1th general-purpose register GRi+1 to and into the jth entry FQj of a floating-point calculation command queue of the 8-byte length.

The movement command "mv.fqgr FQj,GRi" from a command queue illustrated in FIG. 3(C) is a command to transfer and read out stored contents of the jth entry FQj of a floating-point calculation command queue of the 8-byte length to and from the ith general-purpose register GRi and the i+1th general-purpose register GRi+1.

The load command "1dnq GRi,GRj,NQk" to a command queue illustrated in FIG. 3(D) is a command to load word data at an address determined based on stored contents of the ith general-purpose register GRi and the jth general-purpose register GRj to the kth entry NQk of an integer calculation command queue.

The store command "stnq NQk,GRi,GRj" from a command queue illustrated in FIG. 3(E) is a command to store word data at the kth entry NQk of an integer calculation command queue into an address determined based on stored contents of the ith general-purpose register GRi and the jth general-purpose register GRj.

By using such commands as described above, a command to access the floating-point calculation command queue 31 can be executed designating the position of an object for access in the command queue 31 with operands of the command.

Figure 4:
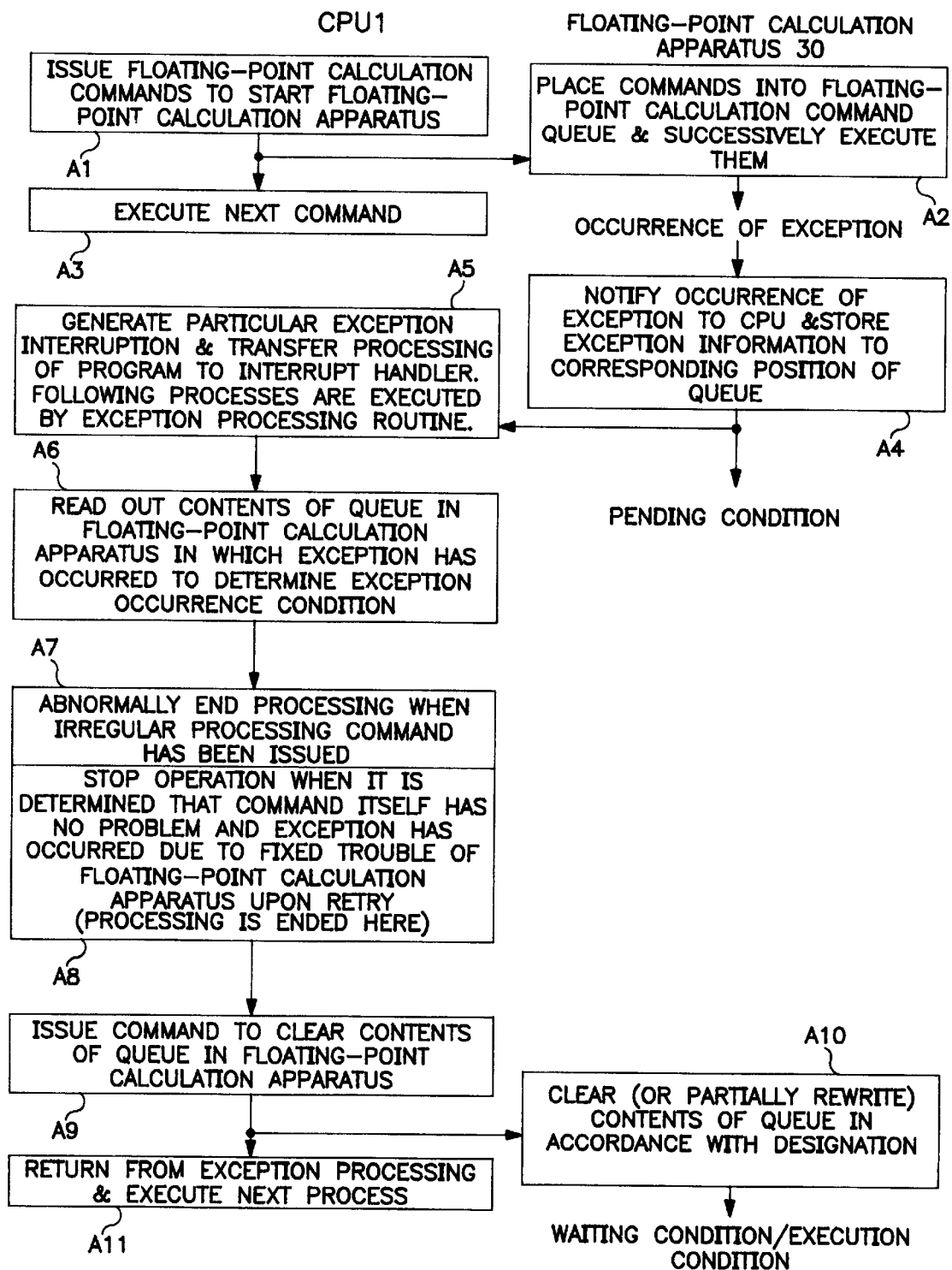
FIG. 4 is a flow chart illustrating a procedure of an exception processing operation executed by the data processing apparatus of FIG. 2.
Figure 5:
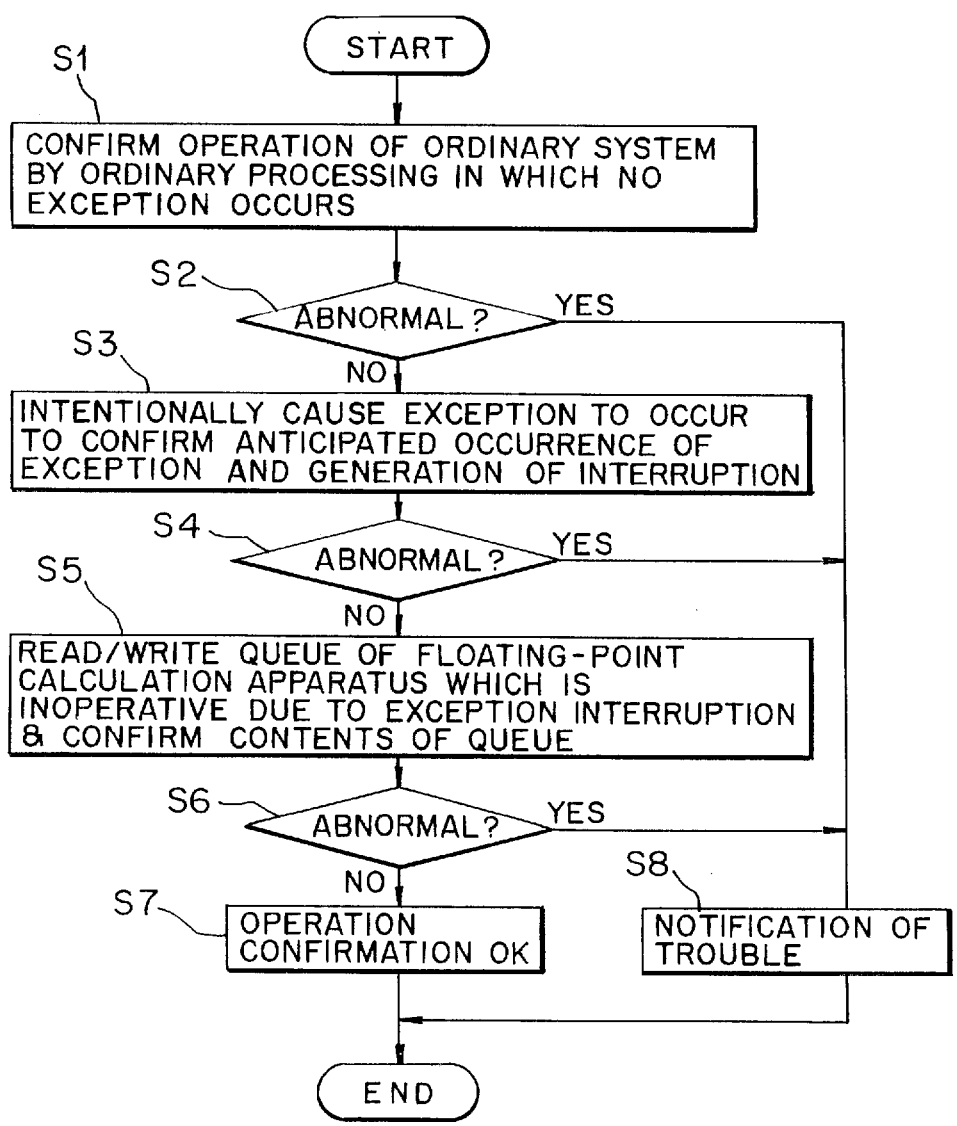
FIG. 5 is a flow chart illustrating a procedure of verification of operation of a coprocessor in the data processing apparatus of FIG. 2.
Figure 6:
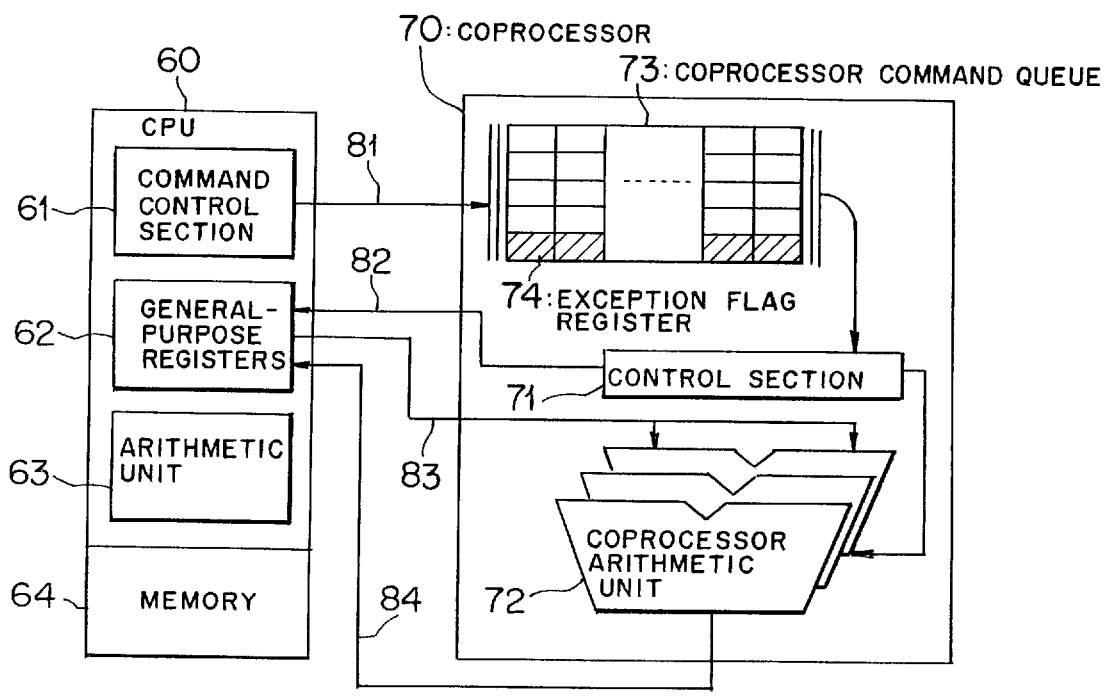
FIG. 6 is a block diagram showing an exemplary construction of a conventional data processing apparatus.

FIGS. 4 and 5 are flow charts of the operation of the data processing apparatus of the present embodiment having the construction described above.

First, a procedure of an exception processing operation of the data processing apparatus of the present embodiment will be described with reference to the flow chart (steps A1 to A11) shown in FIG. 4. It is to be noted that processes by the CPU 1 are illustrated on the left side of a vertical chain line in FIG. 4, while processes by the floating-point calculation apparatus 30 are illustrated on the right side of the vertical chain line. It is to be noted that the CPU 1 and the floating-point calculation apparatus 30 operate asynchronously from each other.

If floating-point calculation commands are included in commands read out from the memory 3, then the CPU 1 issues the floating-point calculation commands from the floating-point command control section 24 to start the floating-point calculation apparatus 30 (step A1).

Thus, the floating-point calculation apparatus 30 stores the commands received from the CPU 1 by way of the command bus 10 into the floating-point calculation command queue 31 and successively executes the commands (step A2). Meanwhile, after the floating-point calculation commands are delivered to the floating-point calculation apparatus 30, the CPU 1 executes a next command without waiting completion of execution of the commands by the floating-point calculation apparatus 30 (step A3).

Then, if an exception regarding execution of a floating-point calculation command occurs in the floating-point calculation apparatus 30, the command control section 32 notifies occurrence of an exception to the CPU 1 and stores the exception information into an exception flag register 38 of the floating-point calculation command queue 31 corresponding to the command at which the exception has occurred (step A4). Then the floating-point calculation apparatus 30 enters into a pending condition from the command execution condition.

Upon reception of the notification of occurrence of an exception from the floating-point calculation apparatus 30, the CPU 1 generates a particular exception interruption to transfer processing of a program to the interrupt handler. The interrupt handler thereafter executes processing by way of an exception processing routine (step A5).

In this instance, the interrupt handler discriminates a type of the interruption, and if the interruption is discriminated as an interruption of the type wherein a command or commands may possibly remain in the floating-point calculation command queue 31, then the interrupt handler does not perform any operation for the floating-point calculation command queue 31. Further, where plural floating-point calculation apparatus 30 are, the interrupt handler checks to determine whether a command remain in each of the floating-point calculation command queues 31 of the floating-point calculation apparatus 30. If no command remains in each of the floating-point calculation command queues 31, then the interrupt handler does not perform any operation for the floating-point calculation command queue 31.

When a remaining command or commands are present in any of the floating-point calculation command queues 31, unless the interruption is originated from the floating-point calculation apparatus 30 to which the floating-point calculation command queue 31 belongs, the interrupt handler ends exception processing after saving the stored contents of the floating-point calculation command queue 31.

On the other hand, if the interruption is originated from the floating-point calculation apparatus 30 to which the floating-point calculation command queue 31 in which a command remains belongs, the interrupt handler executes the processes at steps A6 to A9 described below to edit the stored contents of the floating-point calculation command queue 31 in accordance with the type of the exception occurred. The interrupt handler then writes back the thus edited contents into the floating-point calculation command queue 31 upon returning of the processing from the interruption routine.

In particular, the CPU 1 delivers a read command (refer to FIG. 3(C)) to refer to stored contents of the floating-point calculation command queue 31 and executes the read command by means of the command queue access command control section 25 to read out the stored contents of the floating-point calculation command queue 31 in the floating-point calculation apparatus 30 with which the exception has occurred into a general-purpose register 5. Then, the CPU 1 refers to the contents read out into the general-purpose register 5 to determine an exception occurrence condition (step A6).

If an exception has occurred, due to an irregular floating-point calculation command which cannot be executed regularly such as, for example, to divide a certain value by 0 or to designate an inaccessible area with an operand in the command, the process by the command is abnormally ended (step A7).

On the contrary, if at step A6 there is no problem with the command itself, that is, the floating-point calculation command, which has been supposed to have made a cause of occurrence of the exception, is regular, it is determined by way of a retry or some other suitable means whether a fixed trouble has occurred with the floating-point calculation apparatus 30.

For example, the CPU 1 causes the floating-point calculation apparatus 30 to re-execute (retry) the floating-point calculation command. If an exception occurs also upon such retry of the floating-point calculation command, the CPU 1 determines that the floating-point calculation apparatus 30 suffers from a fixed trouble and ends processing by the floating-point calculation apparatus 30 to stop operation of the system at the point of time (step A8).

On the other hand, after the process is abnormally ended at step A7, the CPU 1 issues a clear command (refer to FIG. 3(A)) to clear the stored contents of the floating-point calculation command queue 31 and executes the clear command by means of the command queue access command control section 25 to clear the stored contents of the floating-point calculation command queue 31 (step A9).

In the meantime, upon reception of the clear command, the floating-point calculation apparatus 30 clears the stored contents at the entry of the floating-point calculation command queue 31 designated by the clear command (step A10). Consequently, execution of floating-point calculation commands following the floating-point calculation command which was being executed at the point of time when the exception occurred is canceled, and the floating-point calculation apparatus 30 enters a waiting condition or an execution condition.

It is to be noted that, depending upon the case, at step A9, instead of issuing a clear command from the CPU 1, a change command (refer to FIG. 3(B)), for changing the stored contents of the floating-point calculation command queue 31, may be issued to the floating-point calculation command queue 31 and executed by means of the command queue access command control section 25 to change the stored contents of the floating-point calculation command queue 31. In this instance, at step A10, the stored contents at the entry of the floating-point calculation command queue 31 designated by the change command are changed, that is, re-written partially or entirely, whereafter the floating-point calculation apparatus 30 enters a waiting condition or an execution condition.

After such processes as described above are executed, the CPU 1 returns the control sequence from the exception processing and executes a next process (step A11).

An operation verification procedure of the data processing apparatus of the present embodiment will be described with reference to the flow chart (steps S1 to S8) shown in FIG. 5. In the data processing apparatus of the present embodiment, a command queue access command is used in an operation confirmation test program to perform a check of the data processing apparatus.

When ordinary floating-point calculation commands written correctly are issued from the CPU 1 to the floating-point calculation apparatus 30, since no exception occurs with the floating-point calculation apparatus 30 unless it suffers from a fixed trouble or the like, in the operation verification procedure described below, ordinary floating-point calculation commands written correctly are issued first to test a normal system of the floating-point calculation apparatus 30, and then an exception is intentionally caused to occur by way of a test program to evaluate the regularity of operation of the floating-point calculation apparatus 30 upon occurrence of the exception.

First, operation of the normal system of the floating-point calculation apparatus 30 is confirmed by way of ordinary processing by which no exception occurs (step S1), and it is determined whether an abnormal condition has occurred (step S2). If an abnormal condition has occurred (when the determination at step S2 is YES), processing of notifying a trouble is performed (step S8).

On the contrary if no abnormal condition occurs (when the determination at step S2 is NO), the CPU 1 intentionally issues, to the floating-point calculation apparatus 30, an irregular floating-point calculation command to cause an exception to occur in the floating-point calculation apparatus 30. It is confirmed whether the anticipated exception and interruption have occurred in response to the irregular floating-point calculation command (step S3). The regularity of operation of the floating-point calculation apparatus 30 upon occurrence of the exception is verified thereby.

If an anticipated exception and interruption have not occurred (when the determination at step S4 is YES), since this is abnormal, processing of notifying a trouble is performed (step S8). On the contrary if an anticipated exception and interruption have occurred (the determination at step S4 is NO), this is normal, and the control sequence advances to step S5.

At step S5, the command queue access command control section 25 of the CPU 1 accesses the floating-point calculation command queue 31 of the floating-point calculation apparatus 30, which is inoperative as a result of the exception interruption, to effect changing, reading or the like of the stored contents using the command queue access command described hereinabove to confirm the stored contents of the floating-point calculation command queue 31 (step S5).

Alternatively, at step S5, the CPU 1 may issue a read command to refer to the stored contents of the floating-point calculation command queue 31 and execute the read command by means of the command queue access command control section 25 to read the stored contents of the floating-point calculation command queue 31 into a general-purpose register 5. In this instance, the CPU 1 refers to the stored contents into the general-purpose register 5 to confirm whether the floating-point calculation commands issued from the CPU 1 to the floating-point calculation apparatus 30 are held in the floating-point calculation command queue 31 to verify the regularity of operation of the floating-point calculation apparatus 30.

Alternatively, at step S5, the CPU 1 may issue a change command to change the stored contents of the floating-point calculation command queue 31 and execute the change command by means of the command queue access command control section 25 to change the contents of the floating-point calculation command queue 31. In this instance, the CPU 1 then issues a read command to refer to the stored contents of the floating-point calculation command queue 31 and executes the read command by means of the command queue access command control section 25 to read out the stored contents of the floating-point calculation command queue 31 into a general-purpose register 5. Then, the CPU 1 refers to the contents read out into the general-purpose register 5 to confirm whether changing access to the floating-point calculation command queue 31 according to the change command has been performed to verify the regularity of operation of the floating-point calculation apparatus 30.

Then, it is determined based on a result of the confirmation of the stored contents at step S5, whether the stored contents are abnormal (step S6). If the stored contents are abnormal (the determination at step S6 is YES), then processing of notifying a trouble is performed (step S8). If the stored contents are not abnormal (the determination at step S6 is NO), then a message signifying that a normal operation has been confirmed is outputted (step S7), thereby ending the processing.

As described above, with the data processing apparatus of the present embodiment, the command queue access command control section 25 for accessing the floating-point calculation command queue 31 from the CPU 1 and a new group of commands for executing accessing to the floating-point calculation command queue 31 are provided.

Accordingly, it can be verified using a read command whether commands instructed from the CPU 1 to the floating-point calculation apparatus 30 are held regularly in the floating-point calculation command queue 31. Besides, the CPU 1 can grasp the entire stored contents of the floating-point calculation command queue 31 when an exception has occurred, and accordingly can grasp a flow of processes executed in the floating-point calculation apparatus 30 in accordance with a series of commands and execute suitable and flexible exception processing. Further, since stored contents of the floating-point calculation command queue 31 can be checked at an arbitrary point of time, information effective for optimization of the processing procedure in development of a program can be obtained.

Further, since the CPU 1 can edit, upon returning from exception processing, the stored contents of the floating-point calculation command queue 31 arbitrarily using the command queue access commands illustrated in FIGS. 3(A) to 3(E), the CPU 1 can take a very flexible countermeasure against an exception. Besides, since the stored contents of the floating-point calculation command queue 31 can be accessed directly from a program of the CPU 1, a test program for automatically detecting a failure can be produced readily, and discovery of a trouble can be performed efficiently using the test program.

The present invention is not limited to the specifically described embodiment, and variations and modifications may be made without departing from the scope of the present invention.

What is claimed is:

1. A data processing apparatus, comprising:
   a central processing section for executing a command and issuing coprocessor commands; and
   a coprocessor connected to said central processing section, said coprocessor having a coprocessor command storage section for storing coprocessor commands issued by said central processing section, said coprocessor asynchronously executing the coprocessor commands which have been stored in the coprocessor command storage section;
   said central processing section having a command execution control section for receiving and executing a command and a second command to arbitrarily access a coprocessor command in the coprocessor command storage section of said coprocessor.

2. A data processing apparatus as claimed in claim 1, wherein said coprocessor command storage section includes a plurality of queues, each of the plurality of queues corresponding to a different type of coprocessor command, and the command of said central processing section to access said coprocessor command storage section is executed by designating an access object position of said coprocessor command storage section.

3. A data processing apparatus, as claimed in claim 1, wherein the read command is a command referring to the stored contents of the coprocessor command storage section.

4. A data processing apparatus, as claimed in claim 2, wherein the read command is a read command referring to the stored contents of the coprocessor command storage section.

5. A data processing apparatus, as claimed in claim 1, wherein the second command of said central processing section to access the coprocessor command in the coprocessor command storage section is a change command to change the stored contents of the coprocessor command storage section.

6. A data processing apparatus, as claimed in claim 2, wherein the second command of said central processing section to access the coprocessor command in the coprocessor command storage section is a change command to change the stored contents of the coprocessor command storage section.

7. A data processing apparatus, as claimed in claim 1, wherein the second command of said central processing section to access the coprocessor command in the coprocessor command storage section is a clear command to clear the stored contents of the coprocessor command storage section.

8. A data processing apparatus, as claimed in claim 2, wherein the second command of said central processing section to access the coprocessor command in the coprocessor command storage section is a clear command to clear the stored contents of the coprocessor command storage section.

9. An exception processing method for a data processing apparatus having a central processing section and a coprocessor connected to said central processing section which operates in accordance with coprocessor commands issued by the central processing section, the exception processing method comprising the steps of:

storing the coprocessor commands in a coprocessor command storage section;

executing in the coprocessor the stored coprocessor commands;

issuing, when an exception regarding the execution of a coprocessor command occurs in the coprocessor, a read command to refer to previously stored contents of the coprocessor command storage section;

executing the read command to read the stored contents of said coprocessor command storage section; and referring to the stored contents read from said coprocessor command storage section to determine an occurrence condition of the exception and executing processing in accordance with the exception.

10. An exception processing method, as claimed in claim 9, further comprising:

issuing a clear command when the coprocessor command causing the exception is an irregular command which cannot be executed regularly, the clear command causing the stored contents of said coprocessor command storage section to be cleared so as to cancel execution of coprocessor commands following the coprocessor command which was being executed when the exception occurred.

11. An exception processing method, as claimed in claim 9, further comprising:

issuing a change command when the coprocessor command causing the exception is an irregular command which cannot be executed regularly, the change command causing the stored contents of said coprocessor command storage section to change so as to change coprocessor commands following the coprocessor command which was being executed when the exception occurred.

12. An exception processing method, as claimed in claim 9, further comprising:

re-executing a command when a determination is made that the coprocessor command causing the exception is regular, and if an exception occurs also upon the re-execution of the coprocessor command, ending the processing by said coprocessor.

13. An operation verification method for a data processing apparatus having a central processing section and a coprocessor connected to said central processing section which operates in accordance with coprocessor commands issued by the central processing section, the operation verification method comprising the steps of:

storing the coprocessor commands in a coprocessor command storage section;

issuing a read command from said central processing section to said coprocessor command storage section referring to the stored contents of the coprocessor command storage section;

executing the read command so as to read the stored contents of the coprocessor command storage section; and referring to the stored contents read from the coprocessor command storage section to determine whether coprocessor commands issued from the central processing section to the coprocessor are held in the coprocessor command storage section to verify the regularity of operation of the coprocessor.

14. An operation verification method for a data processing apparatus having a central processing section and a coprocessor connected to said central processing section responding to coprocessor commands issued by the central processing section, the operation verification method comprising the steps of:

storing the coprocessor commands in a coprocessor command storage section;

issuing from the central processing section to the coprocessor a coprocessor command which will cause an exception to occur;

confirming whether the exception has occurred in the coprocessor in response to the coprocessor command so as to verify the regularity of operation of the coprocessor;

issuing, from the central processing section to the coprocessor command storage section a change command to change stored contents of the coprocessor command storage section;

executing the change command to change the stored contents of the coprocessor command storage section;

issuing, from the central processing section to the coprocessor command storage section, a read command to refer to the stored contents of the coprocessor command storage section;

executing the read command to read the stored contents of the coprocessor command storage section; and referring to the stored contents read from the coprocessor command storage section to determine whether the stored contents of the coprocessor command storage section have been changed so as to verify the regularity of operation of the coprocessor.

15. A data processing apparatus, comprising:

a central processor executing commands and issuing coprocessor commands;

a coprocessor connected to said central processor, said coprocessor having a coprocessor command storage section storing the coprocessor commands issued by said central processor, said coprocessor asynchronously executing the coprocessor commands stored in the coprocessor command storage section; and said central processor having a command execution control section for receiving and executing a read command to read the stored contents of the coprocessor command storage section of said coprocessor.

16. A data processing apparatus, comprising:

a central processor executing commands and issuing coprocessor commands;

a coprocessor connected to said central processor, said coprocessor having a coprocessor command storage section storing the coprocessor commands issued by said central processor, said coprocessor asynchronously executing the coprocessor commands stored in the coprocessor command storage section; and said central processing section having a command execution control section receiving and executing a change command to change the stored contents of the coprocessor command storage section of said coprocessor.

17. A data processing apparatus, comprising:

a central processor executing commands and issuing coprocessor commands;

a coprocessor connected to said central processor, said coprocessor having a coprocessor command storage section storing the coprocessor commands issued by said central processor, said coprocessor asynchronously executing the coprocessor commands stored in the coprocessor command storage section; and said central processing section having a command execution control section receiving and executing a clear command to clear the stored contents of the coprocessor command storage section of said coprocessor.

18. A data processing apparatus, comprising:

a central processor executing commands and issuing coprocessor commands;

a coprocessor connected to said central processor, said coprocessor having a coprocessor command storage section storing the coprocessor commands issued by said central processor, said coprocessor asynchronously executing the coprocessor commands stored in the coprocessor command storage section; and said central processing section having a command execution control section receiving and executing a read command, a change command and a clear command to arbitrarily access a coprocessor command in the coprocessor command storage section of said coprocessor.

19. A data processing apparatus comprising:

a coprocessor having a command storage section storing received coprocessor commands and an execution unit for executing the coprocessor commands stored in the command storage section; and a CPU issuing coprocessor commands by transferring the coprocessor commands to the command storage section, the CPU further directly accessing the command storage section to directly manipulate the coprocessor commands contained therein.

20. A data processing apparatus, as set forth in claim 19, further comprising:

a command bus connecting the CPU to the command storage section over which the CPU transfers coprocessor commands; and an access bus connecting the CPU to the command storage section through which the CPU directly manipulates compressor commands contained in the command storage section.

21. A data processing apparatus, as set forth in claim 19, wherein the CPU directly manipulates the command storage section using a combination of reads, changes and clears.

* * * * *